Feb. 15, 1966    G. R. BELL ETAL    3,235,489
PROCESS OF REMOVING IRON FROM WATER
Filed June 3, 1963
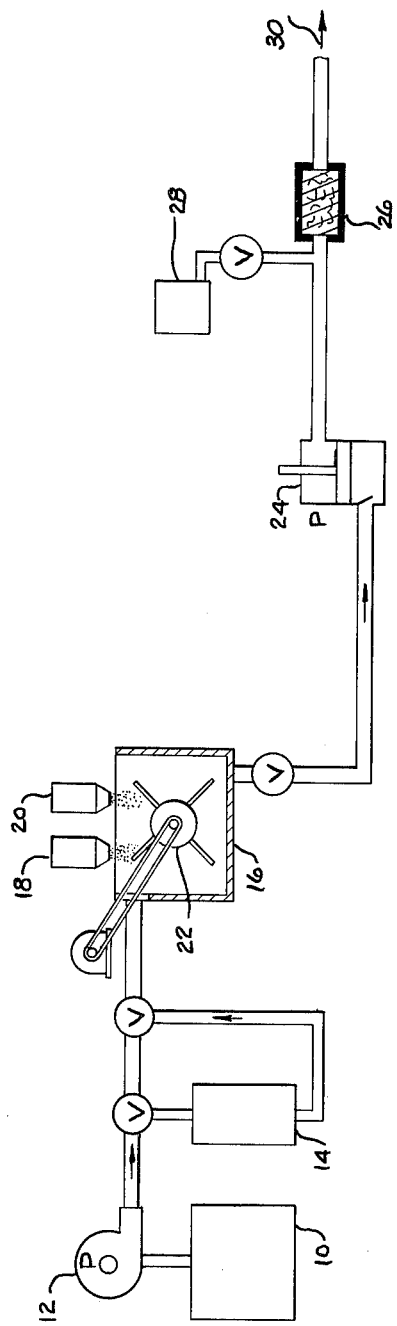
INVENTOR.
GEORGE R. BELL
GEORGE J. COOGAN
BY
John A. McKinney

United States Patent Office 3,235,489
Patented Feb. 15, 1966

3,235,489
PROCESS OF REMOVING IRON FROM WATER
George R. Bell, Martinsville, N.J., and George J. Coogan, Everett, Mass.; said Bell assignor to Johns-Manville Corporation, New York, N.Y., a corporation of New York
Filed June 3, 1963, Ser. No. 284,884
6 Claims. (Cl. 210—51)

The invention relates to the removal of iron as a contaminant in water supplies and particularly to new filter aid filtration techniques for effectively achieving such removal. The invention involves a preconditioning of the filter feed and is useful for the treatment of both ground water and surface water supplies or mixtures thereof.

Iron, usually as a solution of ferrous bicarbonate, is a normal contaminant in water supplies. In amounts in excess of 0.3 part per million, it can cause undesirable taste, discoloration in clothes and plumbing fixtures, incrustation in water systems, discoloration of manufactured products such as textiles or paper, and other difficulties. Unfortunately, the presence of iron is a common occurrence, particularly in well water, and thus is a prevalent difficulty in many areas. Problems arise when the water contacts air, chlorine, or other chemicals capable of oxidizing the ferrous iron to the less soluble ferric state. Ferric hydroxide is virtually insoluble and is precipitated by the oxidization reaction. This is the familiar red-brownish or rusty appearance on sinks, swimming pools, clothing and the like.

Present methods for removing iron which principally include one of two techniques, aeration, detention, and slow sand filtration, or chemical pretreatment, settling, and rapid sand filtration, have proven effective, but have also been expensive in terms of needed equipment and over-all operation.

The rapid sand filters have little inherent clarifying capacity of themselves. The suspended matter therein has to be pretreated to collect or coalesce into sufficiently large agglomerates so as to settle out and be substantially removed in advance of the rapid sand filter. Almost never has the unpretreated water been filtered through rapid sand filters, and it is commonly understood in water works practice that sand filter plants included the pretreatment works which are substantially larger and more expensive than the sand filter structures themselves.

While the above might be termed the traditional approach to water filtration, technologies used by other industries are presently being adapted to water clarification. Specifically, the principle of filter aid filtration, which has demonstrated many advantages in other fields, has shown significant economic and technological advances in water clarification.

This technique involves the incorporation in the liquid to be filtered of a small amount of finely divided particulate material, the filter aid, which functions to form continuously a porous cake upon the filtering surface and in actuality to entrap impurities by various mechanisms. The materials most generally used as filter aids are siliceous materials such as diatomaceous silica and perlite, carbon and fibrous matter such as asbestos and cellulose and the properties of these materials, e.g., porosity, diversity of shape, incompressibility, etc., make them unique for this purpose. A particularly important feature of filter aid filtration is the fine porosity of the filter aid cake which enables the removal of substantial portions of the suspended particles. Filter aid and additional ingredients added to the liquid to be filtered to assist in the filtration have been termed by the art as the "body feed."

In order to increase the efficiency of the filtering process, a precoat of filter aid particles may be provided on the filter septum in addition to the incorporation of particles within the liquid to be filtered. This keeps the main filter cake containing the impurities from coming into direct contact with the filter medium and consequently prevents the gummy particles from clogging the medium and lessening the filtration efficiency.

A more detailed explanation of the prior art attempts at reducing the iron content of water is set out in U.S. Letters Patent application Serial No. 249,782, filed January 7, 1963, and assigned to the instant assignee.

Briefly these attempts have involved modifications of the above-mentioned techniques, and specifically pretreatment of the water so as to prevent the precipitation of iron as by use of the so-called sequestering or chelating agents, e.g., the polyphosphates and by passage through special types of zeolite softeners. In Europe, an additional method of removing iron from water has had limited application. This process has involved passing of the well water through a granular bed of partially calcined dolomitic lime. However, even with the use of filter aid filtration, some difficulties remain as it is sometimes difficult and economically impossible to reduce the amount of iron in water supplies to acceptable levels.

It is therefore a principal object of this invention to provide a practical and economical means whereby the disadvantages of the foregoing iron removal filtration processes may be overcome.

It is a further object of this invention to provide a filter aid filtration method of clarifying and substantially purifying water supplies whereby maximum iron removal effectiveness is achieved.

It is another object of this invention to provide a new filter aid filtration method of producing substantially iron-free water supplies which will economically function in accordance with the advantages mentioned in the foregoing objects.

It is another object of this invention to provide a practical filter aid filtration for purifying iron contaminated water sources to acceptable iron concentration to render them useful for both potable and sensitive industrial purposes.

Additional objects and further scope of applicability of the present invention will become apparent in the detailed description given hereinafter, a representative embodiment of which has been illustrated in the accompanying drawing by way of example only wherein:

The figure is a schematic view of a preconditioning and filtration equipment train useful in carrying out the instant invention.

It has now been determined that the foregoing objects may be satisfied and the above-mentioned problems overcome by providing a novel method of treating the iron contaminated water supply. It has been discovered that by utilizing a new concept of preconditioning, as opposed to pretreatment, the iron may be effectively removed by filter aid filtration. Specifically, the contaminated water to be filtered is first treated with an appropriate alkali or mixture of alkalis, of which the naturally occurring alkalinity of the water may form a part, to impart a pH between 7 and 9 so as to form a precipitate of the iron. The added alkali is so selected as to be a slow reacting material, e.g., $Na_2CO_3$, $CaO$, $Ca(OH)_2$ and the addition controlled so as to attain, with continued agitation for the preconditioning period, which may vary between about 5 to about 15 minutes, a stable PH level within the above range. Filter aid is added substantially simultaneously with the alkali and the resulting preconditioned water subjected to filtration without prior settling. The governing conditions for the preconditioning operations can have considerable latitude so long as the primary objective of precipitating part of the iron in a filterable form is attained. A significant feature of this technique is that it is neither necessary nor desirable to precipitate all of the iron prior to removal. To do so tends to produce the fully oxidized and fully hydrated iron oxide which is difficult to filter. It has been demonstrated that less highly oxidized or hydrated iron oxides have substantially lower filtration resistance and in addition have the property of removing substantial quantities of iron directly from solution by the filter aid filtration. Filtered water iron levels of less than 0.1 p.p.m. and frequently so little as to be undetectable by usual methods can be attained.

It is to be noted that this process also removes some manganese if it is present in the well water, but the removal of manganese is not complete at the pH levels noted and is really effective only at very low manganese concentrations.

To explain more fully the invention, it has been noted that soluble iron can be removed by ion exchange, sorption, or conversion to an insoluble precipitate which can be mechanically removed. Most iron is in the form of soluble ferrous bicarbonates which results from the action of the weak acid occurring from the solution of free $CO_2$ in water on naturally occurring rocks, minerals and decaying vegetation.

This solution process can be reversed to cause precipitation of iron. Thus the $CO_2$ can be blown out of solution by a gas such as air, with partial saturation of the decarbonated water with $O_2$, which will slowly cause the iron to oxidize to the ferric state and precipitate as ferric oxides with varying degrees of hydration. These oxides are said to be a family of compounds rather than a single compound with increasingly higher degrees of hydration, resulting in gel structures which render them increasingly difficult to filter. This oxide phenomenon is more fully explained in the U.S. Geological Survey-Water Supply Paper No. 1549–A by J. D. Hem and W. H. Cropper (1959), entitled "Survey of Ferrous-Ferric Chemical Equilibra and Redox Potentials." The principal disadvantage of the aeration-oxidation process is that reaction rate is low and detention time must therefore be long.

The oxidation of iron to the ferric state can be made to proceed much more rapidly through the use of chemical means. Thus, oxidants such as $Cl_2$ and $KMnO_4$, and strong alkalis such as NaOH cause rapid conversion of ferrous iron to insoluble ferric hydrate. However, this gel is by nature difficult to filter and commercial filtration is preceded by a settling step to avoid this difficulty. Other alkalis such as $Na_2CO_3$, CaO or Ca $(OH)_2$ react more slowly, but in excess and with sufficient time will also produce unfilterable fully hydrated ferric hydroxide gel.

It has now been discovered that a process which occupies a technical area between these two commercial practices may be used with advantageous results. By preconditioning iron-containing water with appropriate alkalis in a selected pH range of 7–9, part of the iron can be precipitated in filterable form and the resultant precipitate cause removal in the filter of the unprecipitated, as well as the precipitated iron. This technique is to be contrasted with the heretofore mentioned pretreatment process as the preconditioning technique sets up or conditions the filter feed to permit direct and practical filtration without any presettling.

With continuing reference to the accompanying drawing, this invention may be utilized in the following manner. Water is drawn from a source such as a well 10, by a centrifugal pump 12 and passed to an aerating tower 14 or alternatively directly into a preconditioning tank 16. If the water is first passed to the aerating tower it is then discharged into the preconditioning tank. Two feeding devices, 18 and 20, are mounted above the tank 16 and discharge the alkali and filter aid, respectively. Upon addition of the chemical and filter aid to the tank, the contents are retained under agitation, as by agitator 22, for between 5 and 15 minutes. The preconditioned water is then pumped by pump 24 to a commercial filter unit 26 with sufficient pressure to overcome both the resistance of the filter itself and the gradually increasing resistance of the accumulating filter cake. The filter is provided with a precoat supply means 28, to feed precoat filter aid to the filter. The filtration rate is controlled at 25 g.p.m. or 1 gallon per sq. ft. per minute (g.s.f.m.). From the filter the water is pumped to end use 30.

The exact nature and amount of alkali used varies according to the amount of iron contaminate and the desired final state of the iron. However, it has been found that amounts between 2.5 and 60 parts per million of liquid to be filtered are generally sufficient to provide a pH of between about 7 and 9 and to reduce the iron concentration to or below the acceptable drinking water standards of the United States Public Health Service. The choice of alkali material is such as to be water soluble and slow reacting, and to produce a filterable hydrate. It has been found that this group of materials consists of alkali metal and alkaline earth metal carbonates, e.g., $Na_2CO_3$, alkaline earth metal hydroxides, e.g., $Ca(OH)_2$, alkaline earth metal oxides, e.g., CaO, alkali metal aluminates, alkali metal ferrates, and mixtures thereof. As noted above and further illustrated in the examples below, the precipitation of ferric hydroxide results in an unfilterable suspension. The resulting iron hydroxide of the instant process is difficult to define, but it is not a ferric hydroxide but rather the family of oxide compounds mentioned above and more fully described in the Hem et al. article.

The filter aid used in the body feed may be any one of the commercially available filter aids such as the diatomaceous silica, expanded perlite, or other filter aids or mixtures of the same. The amount of filter aid added is likewise dictated by the liquid being treated and the desired result. However, it has been found that between 10 and 100 parts per million of liquid to be filtered is generally satisfactory with the above-described amount of alkali. It is to be noted that rather than add the alkali and filter aid separately as described above, the two may be precombined and added as a mixture.

A more complete understanding of the invention will become apparent from the following examples of the operation within the scope of the invention. In all cases the filtration rate was controlled at one gallon per square foot per minute (g.s.f.m.) as a matter of convenience, and all proportions are given as parts per million of liquid to be filtered, or in the case of measurements regarding the contaminants remaining in the filtered water in parts per million of filtered water.

*Example I*

Using the equipment train of FIGURE 1, well water was treated by first passing it through the aerating tower to reduce the $CO_2$ content. Sixty gallons per minute of water containing 9.8 parts per million of iron were treated in the systems. After passage through the aerating tower the aerated water was passed through the detention tank where 40 parts per million of a diatomaceous silica filter aid were added. Agitation was maintained in the tank for approximately fifteen minutes. The resultant mixture was then filtered through a commercially available filter to produce a filtered water having 7.4 parts per million iron. The filter cycle was continued for four hours and produced a rate of head loss increase of less than 0.25 p.s.i. per hour. The fact that the filtered water contained substantially the same amount of iron as did the initial water established that some means other than an air oxidation is required to remove the iron from solution.

*Example II*

Using the identical equipment arrangements of Example I, a source of water was treated having 9.2 parts per million of iron. To the detention tank was added 40 parts per million of a diatomaceous silica filter aid and 10 parts per million sodium hypochlorite. Again a retention time of approximately fifteen minutes was used. The resulting filtered water contained 0.25 part per million iron, however, the filter cycle lasted only 0.3 hour because the rate of head loss increase was beyond permissible limits. It had risen to greater than 25 p.s.i. per hour. This run clearly established that complete oxidation of the iron to $Fe(OH)_3$ resulted in a practically unfilterable suspension.

*Example III*

The technique of Example II was repeated; however, reducing the amount of sodium hypochlorite to 2.5 parts per million. The intial water contained 8.2 parts of iron as opposed to a final filtered water containing 3.0 parts per million. The filter cycle was extended to last one hour, however, the head rate again approached the 25 p.s.i. per hour loss rate. This established that even partial precipitation of $Fe(OH)_3$ results in an unfilterable suspension.

*Example IV*

The same equipment chain as in the previous examples was employed; however, upon aeration the water was passed into the preconditioning tank where 80 parts per million of a diatomaceous silica filter aid were added and sufficient calcium hydroxide to produce a pH between 8 and 8.4. The untreated water contained 7.9 parts per million iron as opposed to the final product which contained 0.2 part per million. The length of the filter cycle was five hours with a resulting rate of head loss increase of 5 p.s.i. per hour. Such a technique illustrated that the partial precipitation of Fe in a form other than $Fe(OH)_3$ renders the precipitate filterable. Feed from the detention tank to the filter contained substantially 4 parts per million unprecipitated iron indicating that complete precipitation is not necessary for total or substantially total iron removal.

*Example V*

In this run 60 parts per million of filter aid were added to the detention tank along with sufficient calcium hydroxide to produce a pH of 7.7 in that tank. The initial water contained between 6 and 10 parts per million iron whereas the final filtered water contained 0.02 part per million. The filter cycle was vastly increased to 17 hours with a net rate of head loss increase of only 1.3 p.s.i. per hour. As in the previous example, not all of the iron in the raw water was precipitated prior to filtration. The soluble iron in the filter feed varied from 0.8 to 4.5 parts per million and averaged 4.0 parts per million.

*Example VI*

In this particular run the water was again aerated and afterwards passed through the detention tank where 60 parts per million filter aid were introduced. Sufficient calcium hydroxide was added to the material to produce a pH between 8.0 and 8.4. In this particular case the preconditioning process was controlled to stabilize the composition, i.e., the treated water, before the filtering cycle was started. Initial water contained 8.0 parts per million iron whereas the final water contained 0.02 part per million. The cycle lasted 18.5 hours with a favorable rate of head loss increase of only 0.65 p.s.i. per hour.

*Example VII*

Example VI was repeated except that the $CaOH_2$ was added to the water as dry, hydrated lime. The results proved that the filter cycle could be maintained at substantially the same length with substantially the same rate of head loss regardless of the form of the lime introduced to the water.

*Example VIII*

A source of water was treated having an initial iron content of 2.0 parts per million. Upon aeration the water was passed through the detention tank where 50 parts per million filter aid were introduced. Sodium carbonate was added in dry form to the preconditioning tank to produce a pH of 7 to 7.2. The filtered water contained 0.02 part per million iron and the filter cycle extended 19.5 hours with a net rate of head loss increase of only 0.7 p.s.i. per hour.

*Example IX*

In this particular example a source of water was first passed through the aerating tower and then into the detention tank. Sixty parts per million of filter aid were introduced and sufficient sodium hydroxide to produce a pH of 8.0. The initial water had 8.0 parts per million iron and the final water contained only 0.02 part per million. However, inasmuch as this again was a strong alkali and precipitated all the iron as $Fe(OH)_3$ it produced an unfilterable suspension as witnessed by the filter cycle lasting less than one-half hour and at that time producing a rate of head loss greater than 25 p.s.i. per hour.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What we claim is:

1. A method of removing contaminants, and particularly soluble iron from water, comprising, continuously preconditioning the water by adding thereto prior to filtration body feed consisting essentially of between 10 and 100 parts per million of water to be filtered of pulverulent filter aid and between 2.5 and 60 parts per million of water to be filtered of a water soluble alkali to produce a pH of the water between 7 and 9, said alkali being selected from the group consisting of alkali metal carbonates, alkaline earth metal carbonates, alkaline earth metal hydroxides, alkaline earth metal oxides, alkali metal aluminates, alkali metal ferrates, and mixtures thereof, mixing and retaining said water containing said body feed in a detention area to insure uniform distribution of said body feed and to affix said contaminant on said filter aid, and filtering said mixture containing water through a filter septum.

2. A method as defined in claim 1 further characterized by maintaining said mixture containing water in said detention area of between about 5 and about 15 minutes.

3. A method as defined in claim 1 wherein the alkali is sodium carbonate.

4. A method as defined in claim 1 wherein the alkali is calcium hydroxide.

5. A method as defined in claim 1 wherein the alkali is calcium oxide.

6. A method as defined in claim 1 wherein the filter aid is selected from the group consisting of diatomaceous silica, perlite, and mixtures thereof.

References Cited by the Examiner

UNITED STATES PATENTS

| 1,304,438 | 5/1919 | Wooster | 127—55 |
| 1,364,387 | 1/1921 | Landreth | 210—42 |
| 1,574,363 | 2/1926 | Calvert | 252—457 |

(Other references on following page)

UNITED STATES PATENTS

| | | | |
|---|---|---|---|
| 1,806,471 | 5/1931 | Kramer | 127—55 |
| 2,098,762 | 11/1937 | Schmidt | 252—457 |
| 2,438,033 | 3/1948 | Brown et al. | 127—55 X |
| 2,468,188 | 4/1949 | Frankenhoff | 210—75 |
| 3,066,519 | 12/1962 | Boswinkle et al. | 68—18.1 X |

FOREIGN PATENTS

| | | |
|---|---|---|
| 367,407 | 2/1932 | Great Britain. |
| 1,203,624 | 8/1959 | France. |

OTHER REFERENCES

Connell et al.: Water Treatment With Limestone, bulletin of the A and M College of Texas, 4th series, vol. 12, Dec. 15, 1941, College Station, Texas, pp. 9–12 and 55–68 relied on.

Coogan: Diatomite Filtration for Removal of Iron and Manganese, Jour. AWWA, vol. 54, December 1962, apparent effective date of June 19, 1962, pp. 1507–1517.

MORRIS O. WOLK, *Primary Examiner*.